US012669607B2

(12) United States Patent
Fronczak et al.

(10) Patent No.: US 12,669,607 B2
(45) Date of Patent: Jun. 30, 2026

(54) TECHNIQUES FOR RAPID SOA MODULATION

(71) Applicant: AEVA, INC., Mountain View, CA (US)

(72) Inventors: Kevin Fronczak, Fairport, NY (US); Murat Ozbas, Penfield, NY (US); Bryce Bradford, Cupertino, CA (US)

(73) Assignee: AEVA, INC., Mountain View, CA (US)

( * ) Notice: Subject to any disclaimer, the term of this patent is extended or adjusted under 35 U.S.C. 154(b) by 701 days.

(21) Appl. No.: 18/307,288

(22) Filed: Apr. 26, 2023

(65) Prior Publication Data

US 2024/0361457 A1 Oct. 31, 2024

(51) Int. Cl.
*G01S 17/00* (2020.01)
*G01S 7/481* (2006.01)
*G01S 17/26* (2020.01)
*G01S 17/931* (2020.01)

(52) U.S. Cl.
CPC ............ *G01S 17/26* (2020.01); *G01S 7/4817* (2013.01); *G01S 17/931* (2020.01)

(58) Field of Classification Search
USPC ......................................... 356/4.01
See application file for complete search history.

(56) References Cited

U.S. PATENT DOCUMENTS

| | | | | |
|---|---|---|---|---|
| 11,119,213 | B2 * | 9/2021 | Bradford | G01S 7/4911 |
| 11,789,131 | B1 * | 10/2023 | Bohannon | G01S 17/34 356/5.09 |
| 11,867,814 | B1 * | 1/2024 | Bohannon | G01S 17/89 |
| 11,914,038 | B2 * | 2/2024 | Bradford | G01S 17/88 |
| 2006/0103472 | A1 * | 5/2006 | Fukuda | H03F 3/08 330/308 |
| 2008/0007640 | A1 * | 1/2008 | Fuchikami | H04N 25/771 348/E3.018 |
| 2011/0317726 | A1 * | 12/2011 | Tamaoki | H01S 3/1001 372/25 |
| 2016/0226219 | A1 * | 8/2016 | Caillaud | H01S 5/02407 |
| 2020/0271784 | A1 * | 8/2020 | Bradford | G01S 7/486 |
| 2022/0146675 | A1 * | 5/2022 | Bradford | G01S 17/88 |
| 2023/0319447 | A1 * | 10/2023 | Minoofar | H04Q 11/0005 398/58 |
| 2024/0027873 | A1 * | 1/2024 | Antanavicius | G02F 1/392 |

* cited by examiner

*Primary Examiner* — James R Hulka
(74) *Attorney, Agent, or Firm* — Womble Bond Dickinson (US) LLP

(57) ABSTRACT

A frequency-modulated continuous-wave (FMCW) light detection and ranging (LIDAR) system includes a high-pass filter that includes a first connection and a second connection. The system includes an optical amplifier that couples to the first connection of the high-pass filter. The system includes a power source that couples to the first connection of the high-pass filter and provides power to the optical amplifier. The system includes switching circuitry that includes an output that couples to the second connection of the high-pass filter. The switching circuitry produces at the output a first voltage level and a second voltage level. The first voltage level causes the optical amplifier to turn on, and the second voltage level causes the optical amplifier to turn off.

20 Claims, 8 Drawing Sheets

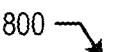

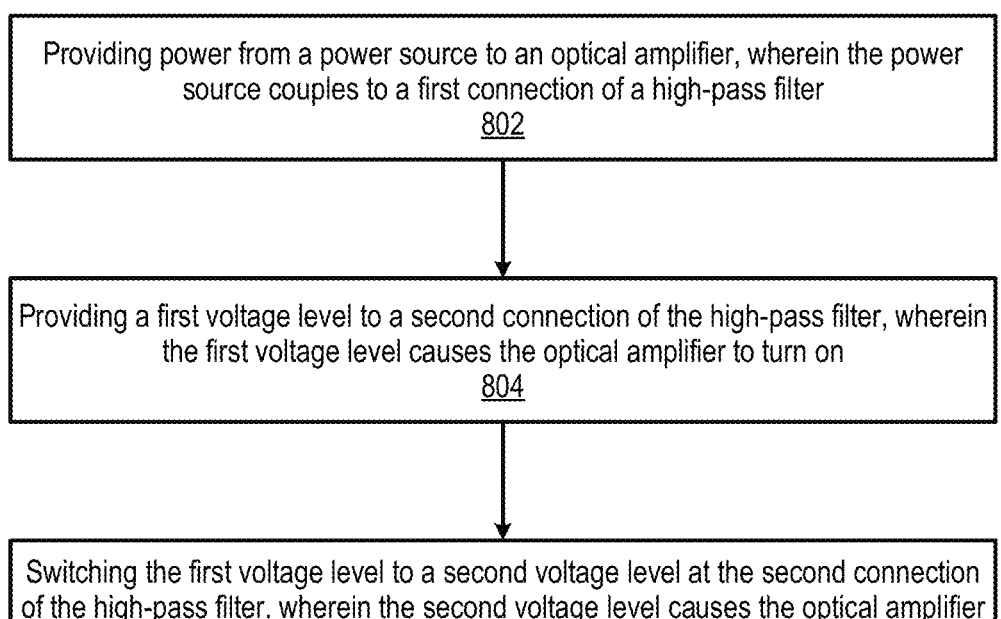

Providing power from a power source to an optical amplifier, wherein the power source couples to a first connection of a high-pass filter
802

Providing a first voltage level to a second connection of the high-pass filter, wherein the first voltage level causes the optical amplifier to turn on
804

Switching the first voltage level to a second voltage level at the second connection of the high-pass filter, wherein the second voltage level causes the optical amplifier to turn off
806

FIG. 8

TECHNIQUES FOR RAPID SOA MODULATION

TECHNICAL FIELD

The present disclosure relates generally to light detection and ranging (LIDAR) systems, and more particularly to systems and methods for rapid semiconductor optical amplifier (SOA) modulation.

BACKGROUND

Frequency-Modulated Continuous-Wave (FMCW) LIDAR systems use wavelength tunable lasers for frequency-chirped illumination of targets. FMCW LIDAR systems use semiconductor optical amplifiers (SOAs) to apply gain to the laser signal to manage the total optical power output. An SOA includes a semiconductor element that amplifies a laser signal by stimulated emission relative to the gain. The gain is produced through current injection and enables the SOA to amplify the optical intensity of the laser signal without converting the laser signal to electrical signals for amplification.

SUMMARY

As discussed above, SOAs are used to apply gain to a laser signal to increase the total output optical power. A challenge found is that SOAs require a large amount of power to operate and are temperature-sensitive, becoming less efficient as the temperature increases. To manage the temperature sensitivity, thermo-electric coolers (TECs) are often used to maintain a constant temperature for the SOA. Similar to the SOAs, the TECs also require a large amount of power to operate, which is relative to the amount of heat generated by the SOA.

Discussed herein is a system that reduces the overall power and heat output of an SOA that, in turn, also reduces the power requirement of its corresponding TEC. The system includes a high-pass filter that includes a first connection and a second connection. An optical amplifier couples to the first connection of the high-pass filter, and a power source of the optical amplifier also couples to the first connection of the high-pass filter. The system includes switching circuitry that couples to the second connection of the high-pass filter and produces a first voltage level and a second voltage level. When the switching circuitry applies the first voltage level to the high-pass filter, the first voltage level causes the optical amplifier to turn on. When the switching circuitry applies the second voltage level to the high-pass filter, the second voltage level causes the optical amplifier to turn off.

In some embodiments, a duty cycle period of the switching circuitry includes switching the first voltage level to the second voltage level, and then switching the second voltage level back to the first voltage level. In some embodiments, the system includes an optical source that produces an optical beam having a linear chirp according to a change in frequency modulation. The optical beam is input to the optical amplifier and the duty cycle period commences at a transition point of the linear chirp. In some embodiments, the duty cycle period occurs within a region-of interest of the FMCW LIDAR system. In some embodiments, a region-of-interest of the FMCW LIDAR system is an area within a field-of-view (FOV) that is of interest to the FMCW LIDAR system and set by the FMCW LIDAR system. For example, the region-of-interest may be set based on surrounding areas requiring high accuracy, surrounding obstacles, a portion of a surrounding environment, etc. In some embodiments, the duty cycle period is less than or equal to two microseconds.

In some embodiments, the optical amplifier includes an anode that couples to the first connection of the high-pass filter. The system also includes an inductor that couples to the power supply and the first connection. The inductor causes a voltage level at the anode to increase at a time constant when the switching circuitry produces the second voltage level at the output.

In some embodiments, the first voltage level and the second voltage level are non-overlapping at the output of the switching circuitry. In some embodiments, the system includes an integrated circuit that includes the optical amplifier and a thermal-electric cooler (TEC) that cools the optical amplifier.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURES

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 8 is a flow diagram illustrating an example method of operating a frequency modulated continuous wave (FMCW) light detection and ranging (LIDAR) system, according to some embodiments of the present disclosure.

DETAILED DESCRIPTION

According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

As discussed above, a challenge found with SOAs is that SOAs require a large amount of power to operate and are temperature-sensitive. And, similar to the SOAs, the TECs also require a large amount of power to operate, which is relative to the amount of heat generated by the SOA. To reduce the heat of the SOA, the current in the SOA is reduced to zero or near-zero and conventional systems may power cycle the SOA power source outside the field-of-view (FOV) of the system. This approach, however, is slow and fundamentally limited by the time constants of the power supply which are typically on the order of 100's of microseconds (μs) up to milliseconds (ms). Duty-cycling within the FOV requires single-digit microsecond or less duty cycles and, therefore, conventional approaches are too slow.

Discussed herein is an approach that enables rapid SOA duty-cycling to reduce the power and heat output of an SOA, which in turn reduces the power requirement of its corresponding TEC. The approach improves the performance of an FMCW LIDAR system by reducing the power requirements of the system. In addition, the approach may improve the reliability of the LIDAR system, particularly the SOA, by reducing the overall amount of heat dissipation of the SOA during operation.

Figure 1:
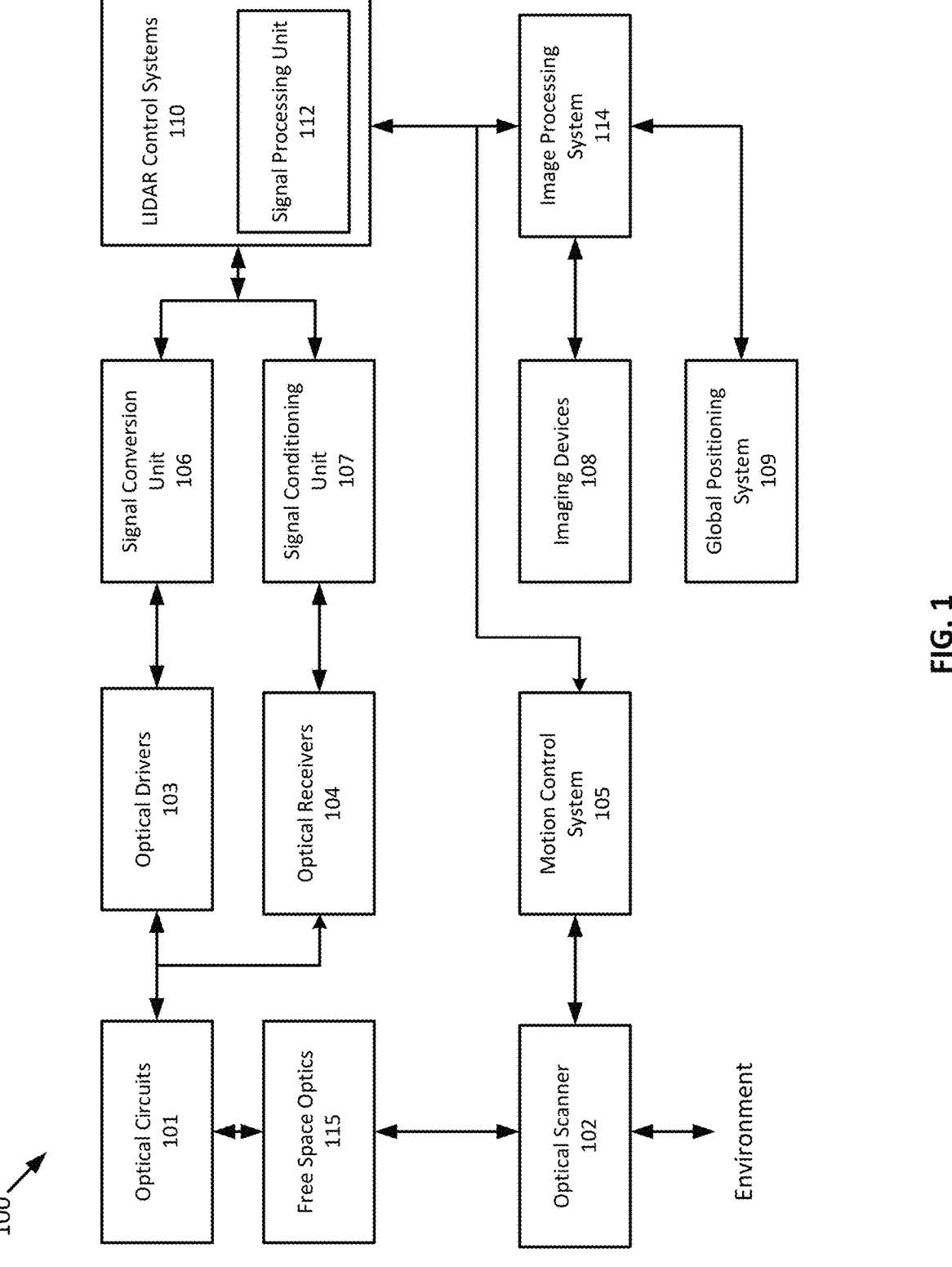
FIG. 1 is a block diagram illustrating an example of a LIDAR system, according to some embodiments.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free-space relative to the vehicle. In some embodiments, the vehicle may include a steering system and a braking system, each of which may work in combination with one or more LIDAR systems 100 according to any information (e.g., one or more rigid transformations, distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources. In some embodiments, optical drivers 103 includes rapid SOA modulation circuitry shown in FIGS. 3, 6, 7, or a combination thereof.

The LIDAR control system 110 is also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
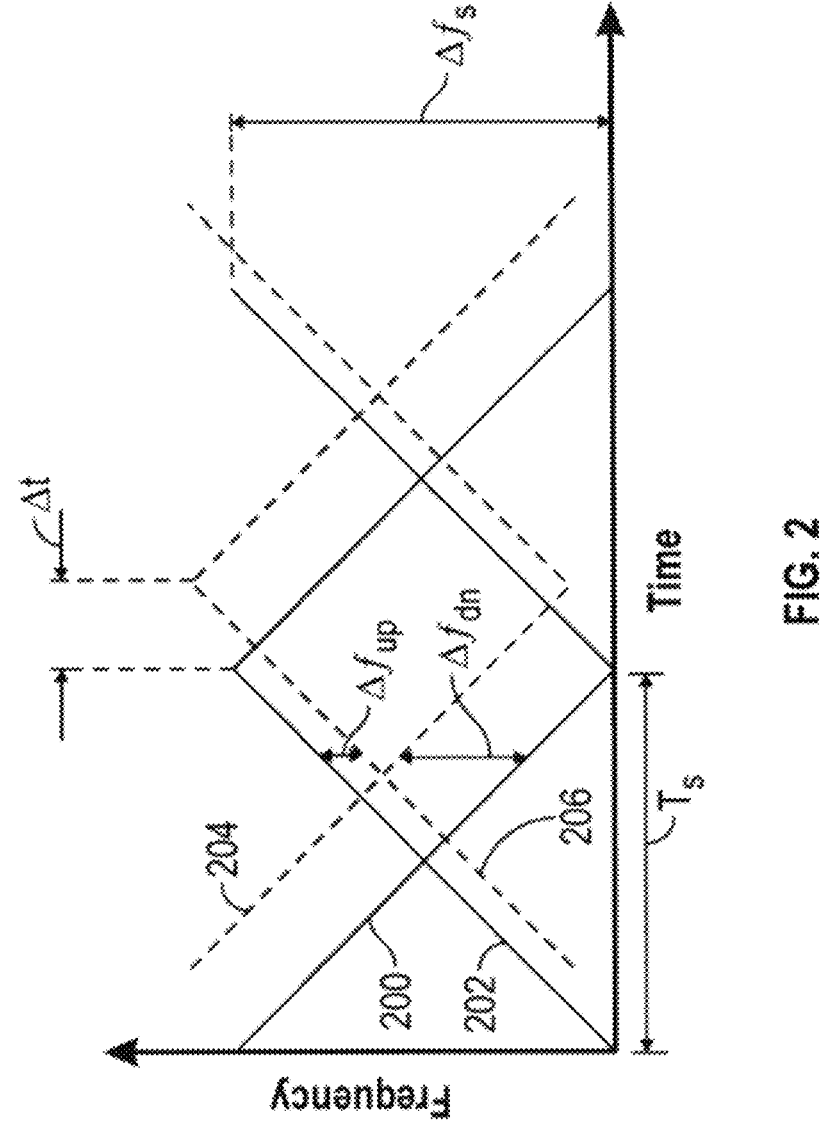
FIG. 2 is a time-frequency diagram illustrating an example of an FMCW scanning signal that can be used by a LIDAR system, according to some embodiments.

FIG. 2 is a time-frequency diagram of FMCW scanning signals that can be used by a LIDAR system, according to some embodiments. The FMCW scanning signals 200 and 202 may be used in any suitable LIDAR system, including the system 100, to scan a target environment. The scanning signal 200 may be a triangular waveform with an up-chirp and a down-chirp having a same bandwidth $\Delta f_s$ and period $T_s$. The other scanning signal 202 is also a triangular waveform that includes an up-chirp and a down-chirp with bandwidth $\Delta f_s$ and period $T_s$. However, the two signals are inverted versions of one another such that the up-chirp on scanning signal 200 occurs in unison with the down-chirp on scanning signal 202.

FIG. 2 also depicts example return signals 204 and 206. The return signals 204 and 206, are time-delayed versions of the scanning signals 200 and 202, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as R=c(Δt/2).

In embodiments, the time delay Δt is not measured directly, but is inferred based on the frequency difference values between the outgoing scanning waveforms and the return signals. When the return signals 204 and 206 are optically mixed with the corresponding scanning signals, a signal referred to as a "beat frequency" is generated, which is caused by the combination of two waveforms of similar but slightly different frequencies. The beat frequency indicates the frequency difference value between the outgoing scanning waveform and the return signal, which is linearly related to the time delay Δt by the slope of the triangular waveform.

If the return signal has been reflected from an object in motion, the frequency of the return signal will also be affected by the Doppler effect, which is shown in FIG. 2 as an upward shift of the return signals 204 and 206. Using an up-chirp and a down-chirp enables the generation of two beat frequencies, $\Delta f_{up}$ and $\Delta f_{dn}$. The beat frequencies $\Delta f_{up}$ and $\Delta f_{dn}$ are related to the frequency difference value cause by the range, $\Delta f_{Range}$, and the frequency difference value cause by the Doppler shift, $\Delta f_{Doppler}$, according to the following formulas:

$$\Delta f_{up} = \Delta f_{Range} - \Delta f_{Doppler} \tag{1}$$

$$\Delta f_{dn} = \Delta f_{Range} + \Delta f_{Doppler} \tag{2}$$

Thus, the beat frequencies $\Delta f_{up}$ and $\Delta f_{dn}$ can be used to differentiate between frequency shifts caused by the range and frequency shifts caused by motion of the measured object. Specifically, $\Delta f_{Doppler}$ is the difference value between the $\Delta f_{up}$ and $\Delta f_{an}$ and the $\Delta f_{Range}$ is the average of $\Delta f_{up}$ and $\Delta f_{dn}$.

The range to the target and velocity of the target can be computed using the following formulas:

$$\text{Range} = \Delta f_{Range} \frac{cT_s}{2\Delta f_s} \tag{3}$$

$$\text{Velocity} = \Delta f_{Doppler} \frac{\lambda_c}{2} \tag{4}$$

In the above formulas, $\lambda_c = c/f_c$ and $f_c$ is the center frequency of the scanning signal. The beat frequencies can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100.

In some scenarios, to ensure that the beat frequencies accurately represent the range and velocity of the object, beat frequencies can be measured at a same moment in time, as shown in FIG. 2. Otherwise, if the up-chirp beat frequency and the down-chirp beat frequencies were measured at different times, quick changes in the velocity of the object could cause inaccurate results because the Doppler effect would not be the same for both beat frequencies, meaning that equations (1) and (2) above would no longer be valid. In order to measure both beat frequencies at the same time, the up-chirp and down-chirp can be synchronized and transmitted simultaneously using two signals that are multiplexed together.

Figure 3:
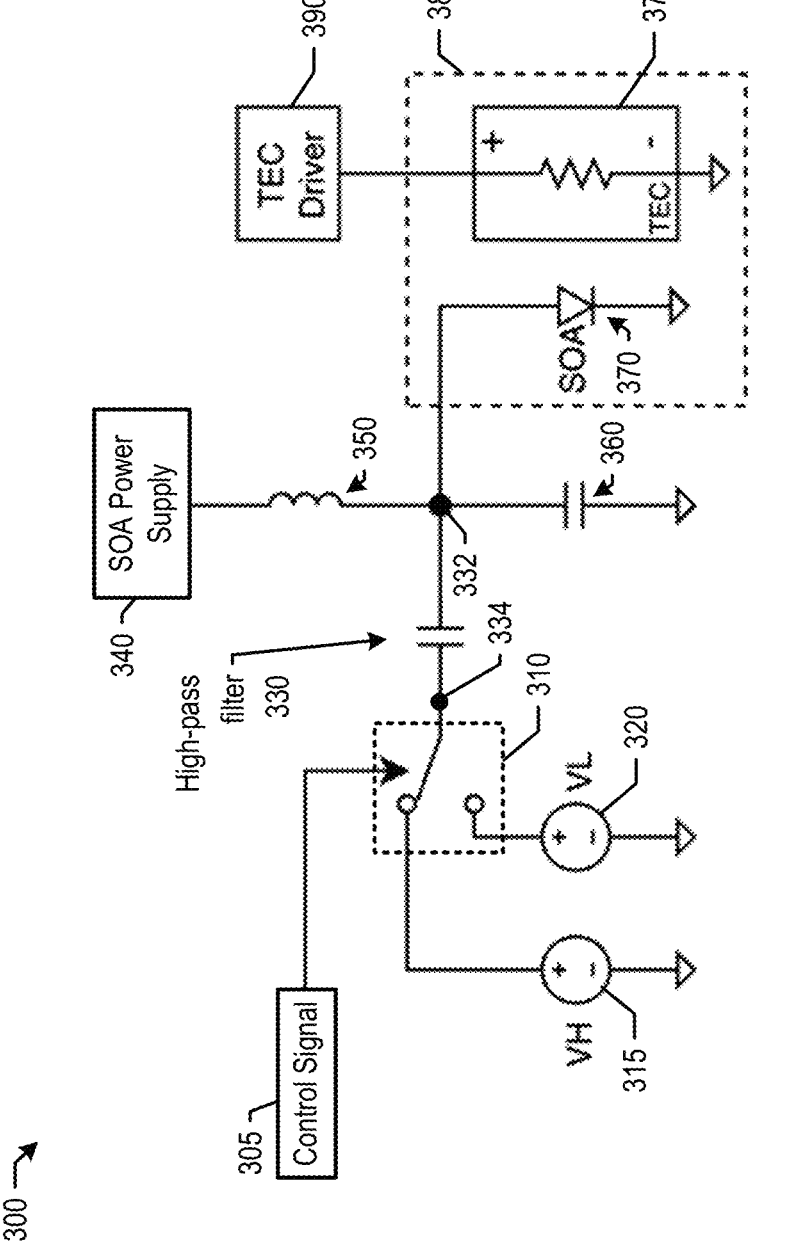
FIG. 3 is a diagram depicting an example of rapid SOA modulation circuitry, according to some embodiments.

FIG. 3 is a diagram depicting an example of rapid SOA modulation circuitry, according to some embodiments. Diagram 300 includes high-pass filter 330 (e.g., a capacitor). High-pass filter 330 includes connection 332 (first connection) and connection 334 (second connection). SOA power supply 340 couples to the connection 332 via inductor 350. In addition, the anode of SOA 370 couples to the connection 332 and the cathode of SOA 370 couples to ground. In some embodiments, SOA 370 is part of module 380, which includes thermo-electric cooler (TEC) 375 to cool SOA 370 and is powered by TEC driver 390.

Diagram 300 also includes control signal 305, switch 310 (e.g., switching circuitry), VH (high voltage) 315 and VL (low voltage) 320. Control signal 305 controls which voltage switch 310 provides to connection 334 of high-pass filter 330. During normal operation, control signal 305 selects high voltage 315, and connection 334 of high-pass filter 330 references to high voltage 315 and SOA 370 receives power from SOA power supply 340. In some embodiments, the timing of control signal 305 is relative to transition points of the linear chirp (see FIG. 5 and corresponding text for further details).

When control signal 305 duty cycles and selects low voltage 320, connection 334 of high-pass filter 330 references to low voltage 320. The voltage change requires an instantaneous change in current through high-pass filter 330, which pulls down connection 332 of high-pass filter 330 and the anode of SOA 370. The instantaneous change in current causes the voltage at connection 332 to collapse, and the current through SOA 370 instantaneously drops to a value the prevents laser emission through SOA 370. In some embodiments, the amount of time for the current to drop may limited by the transition time of the switch 310, which can be on the order of nanoseconds (ns) (see FIG. 4 and corresponding text for further details). To complete the duty cycle period, control signal 305 selects high voltage 315 and connection 334 references back to high voltage 315. This injects a surge of current back into the anode of SOA 370, which is equivalent to the current that was previously removed, and returns the SOA 370 to normal operation. Capacitor 360 provides filtering on the initial surge of current and prevents high frequency components from coupling into SOA 370 and disrupting normal operation.

In some embodiments, during the duty cycle period when connection 344 references to low voltage 320, inductor 350 remains charged because inductor properties do not allow instantaneous current flow. As such, when control signal 305 selects low voltage 320, inductor 350 begins to re-charge the anode of SOA 370 after some time according to a time constant, such as T=L/R where T is the time constant, L is the inductance of inductor 350, and R is the total circuit resistance, which includes the DC resistance of inductor 350 and the resistance of SOA 370. Due to inductor 350 naturally recharging, the anode of SOA 370 remains collapsed for a small amount of time, such as single-digit microseconds (μs). Because the switching circuitry is intended for fast duty-cycling applications, the recharging event is a self-repairing safety feature if switch 310 fails and is not able to reconnect to high voltage 315. In this situation, inductor 350 simply re-balances the charge on high-pass filter 330 until normal operation resumes.

Figure 4:
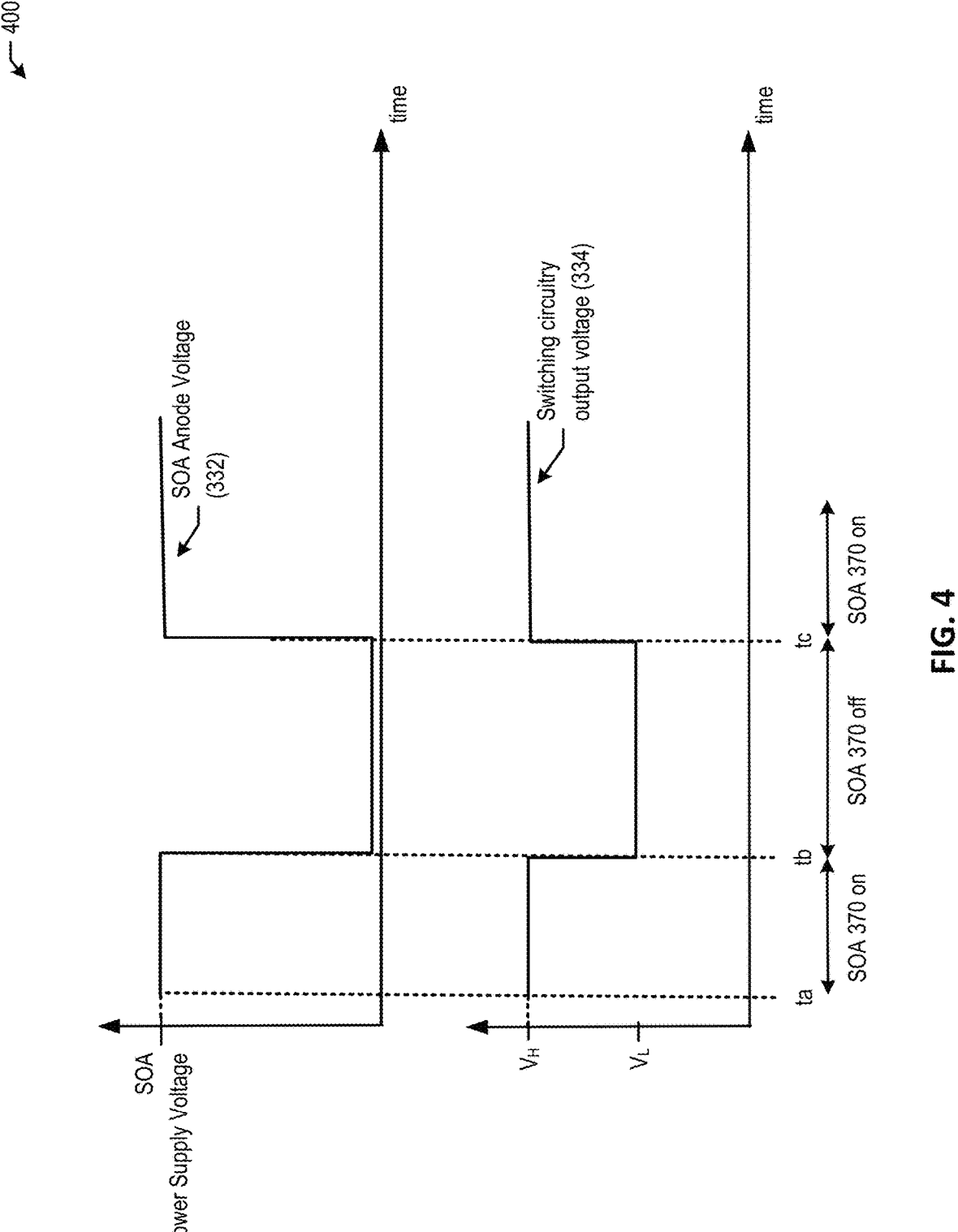
FIG. 4 is a diagram depicting an example of duty-cycling switching circuitry to rapidly turn on and turn off the SOA, according to some embodiments.

FIG. 4 is a diagram depicting an example of duty-cycling switching circuitry to rapidly turn on and turn off the SOA, according to some embodiments. At time ta, control signal 305 selects high voltage 315 for connection 334 of high-pass filter 330. As such, the voltage level of anode of SOA 370 is equivalent to SOA power supply 340 and turns on between time ta and tb.

At time tb, control signal 305 selects low voltage 320 for connection 334 of high-pass filter 330. At this point, the sudden change in voltage at connection 334 requires an instantaneous change in current through high-pass filter 330, which pulls down connection 332 of high-pass filter 330 and the anode of SOA 370. Since the voltage at connection 332 also collapses, the current in SOA 370 instantaneously drops to a value the prevents laser emission through SOA 370, which turns off SOA 370 at time tb through time tc.

At time tc, control signal 305 selects high voltage 315 for connection 334 of high-pass filter 330. In turn, the SOA anode voltage increases and turns on SOA 370. An advantage of rapid SOA switching, as shown in FIG. 4, allows the duty cycle period to occur within a region-of-interest of the FMCW Lidar system (see FIG. 5 and corresponding text for further details).

Figure 5:
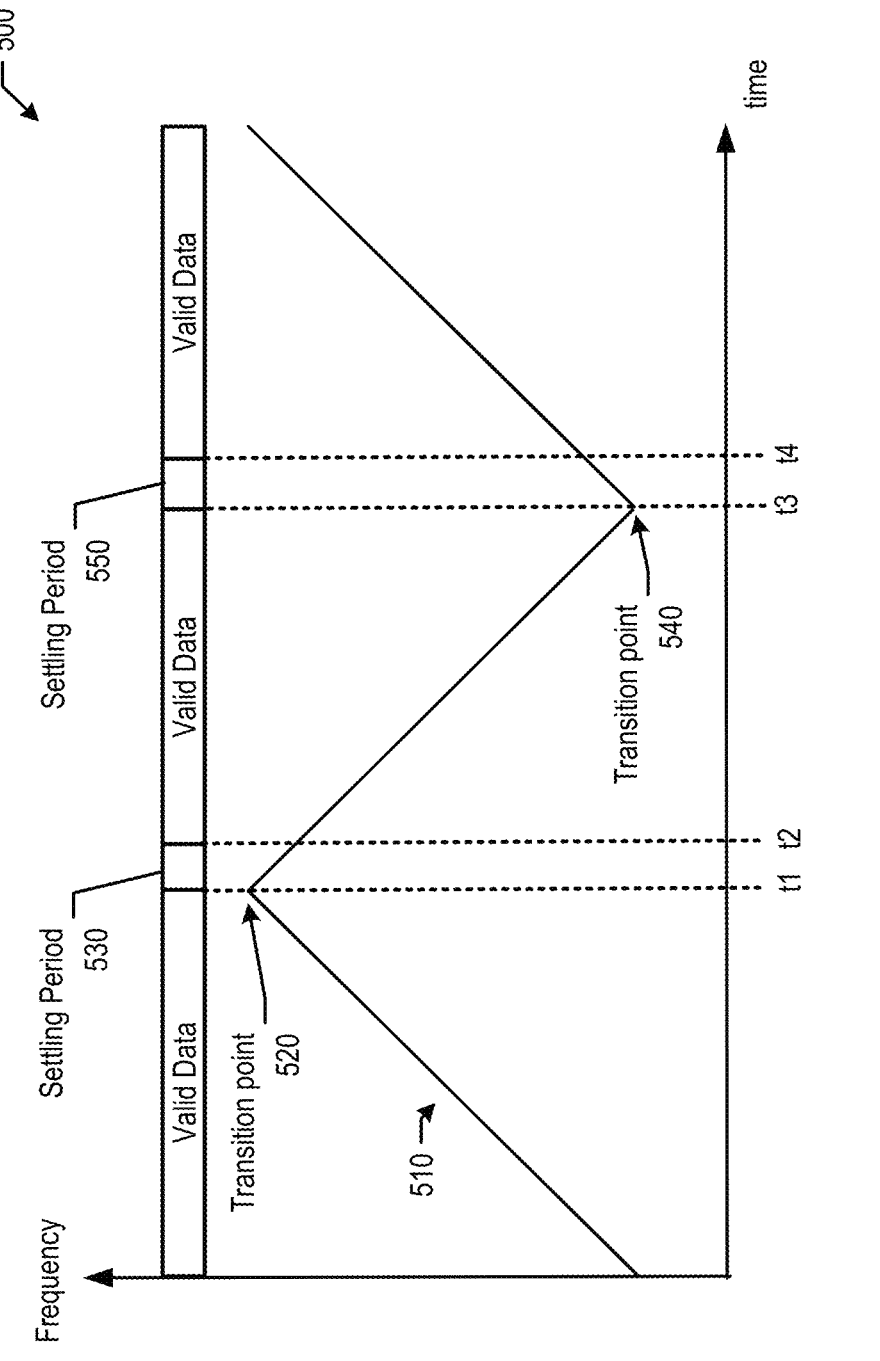
FIG. 5 is a timing diagram depicting an example of duty-cycling the SOA within a region-of-interest at linear chirp transition points, according to some embodiments.

FIG. 5 is a timing diagram depicting an example of duty-cycling the SOA within a an FMCW LIDAR system region-of-interest at linear chirp transition points, according to some embodiments. Diagram 500 includes scanning signal 510, which is similar to scanning signals 200 and 202 shown in FIG. 2. During linear chirp transitions, which is a transition from an up-chirp to a down-chirp (520), or from a down-chirp to an up-chirp (540), a typical laser driver requires time to settle to a correct operating point. This settling period 530 from t1 to t2, and 550 from time t3 to t4, includes unreliable information for signal processing and is often discarded. As such, power utilized during the settling periods is wasted since it does not result in reliable data. Therefore, SOA 370 may be turned off and re-charged during the settling periods without degrading performance. For example, the duty cycle period of SOA 370 may be 2 microseconds (μs) where SOA 370 is discharged for 1 μs and returned to normal operation for the next 1 μs to ensure it is fully settled before the settling period ends and signal processing begins.

Figure 6:
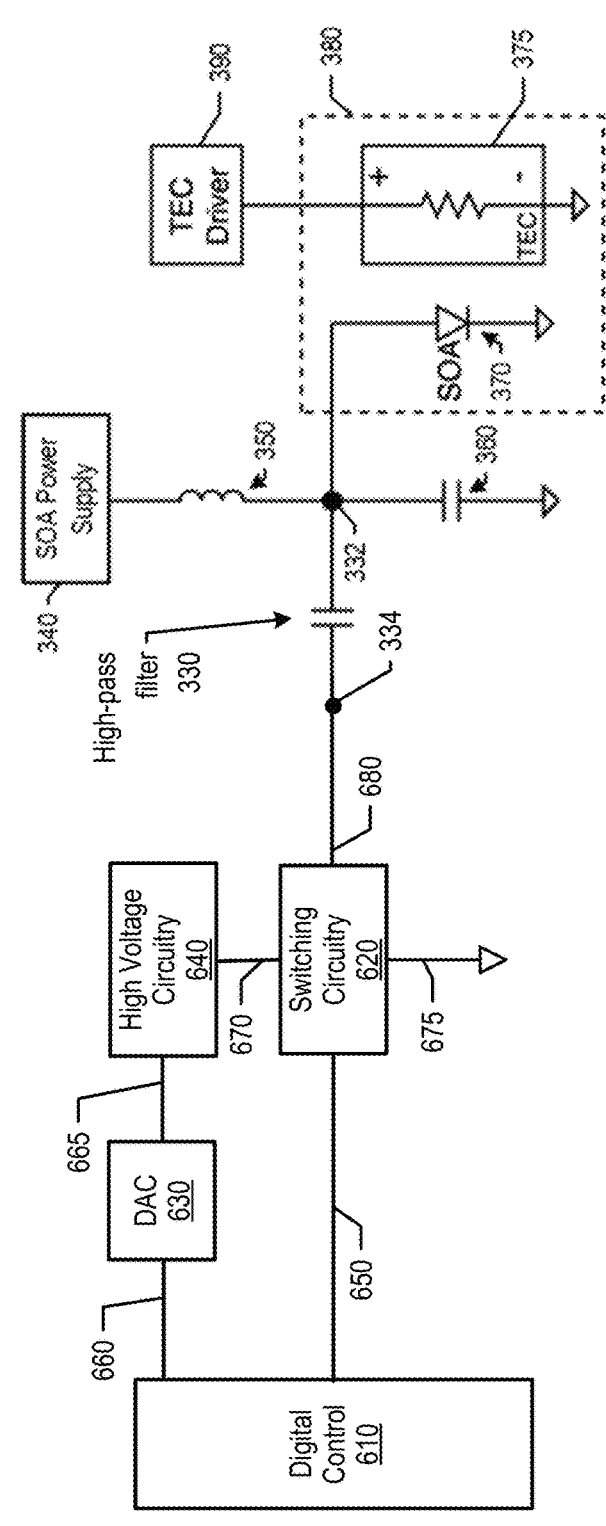
FIG. 6 is a diagram depicting an example of using a digital-to-analog converter to control the voltage level of one of the voltage inputs to the switching circuitry, according to some embodiments.

FIG. 6 is a diagram depicting an example of using a digital-to-analog converter to control the voltage level of one of the voltage inputs to the switching circuitry, according to some embodiments.

Diagram 600 shows digital control 610, digital-to-analog converter (DAC) 630, high voltage circuitry 640, and switching circuitry 620. Digital control 610 provides a digital signal 660 into DAC 630 for setting a voltage level output (670) for high voltage circuitry 640. DAC 630 converts digital signal 660 into analog signal 665, and provides analog signal 665 to high voltage circuitry 640. In some embodiments, high voltage circuitry 640 includes an op amp that provides a control signal to a transistor (e.g., MOSFET). In turn, the value of high voltage 670 is controlled by analog signal 665.

In some embodiments, switching circuitry 620 includes control logic that controls a series of transistors (e.g., MOSFETs). Switching circuitry 620 receives control signal 650 (e.g., control signal 305) from digital control 610 to select either high voltage 670 or low voltage 675 (ground) to provide as an output 680 to the connection 334 of high-pass filter 330. In some embodiments, digital control 610 is part of, or receives signals from, scanning circuitry (e.g., in optical drivers 103) that indicates chirp transition times as shown in FIG. 4. This enables digital control 610 to duty cycle SOA 370 during settling times with the FOV of the FMCW LIDAR system.

Figure 7:
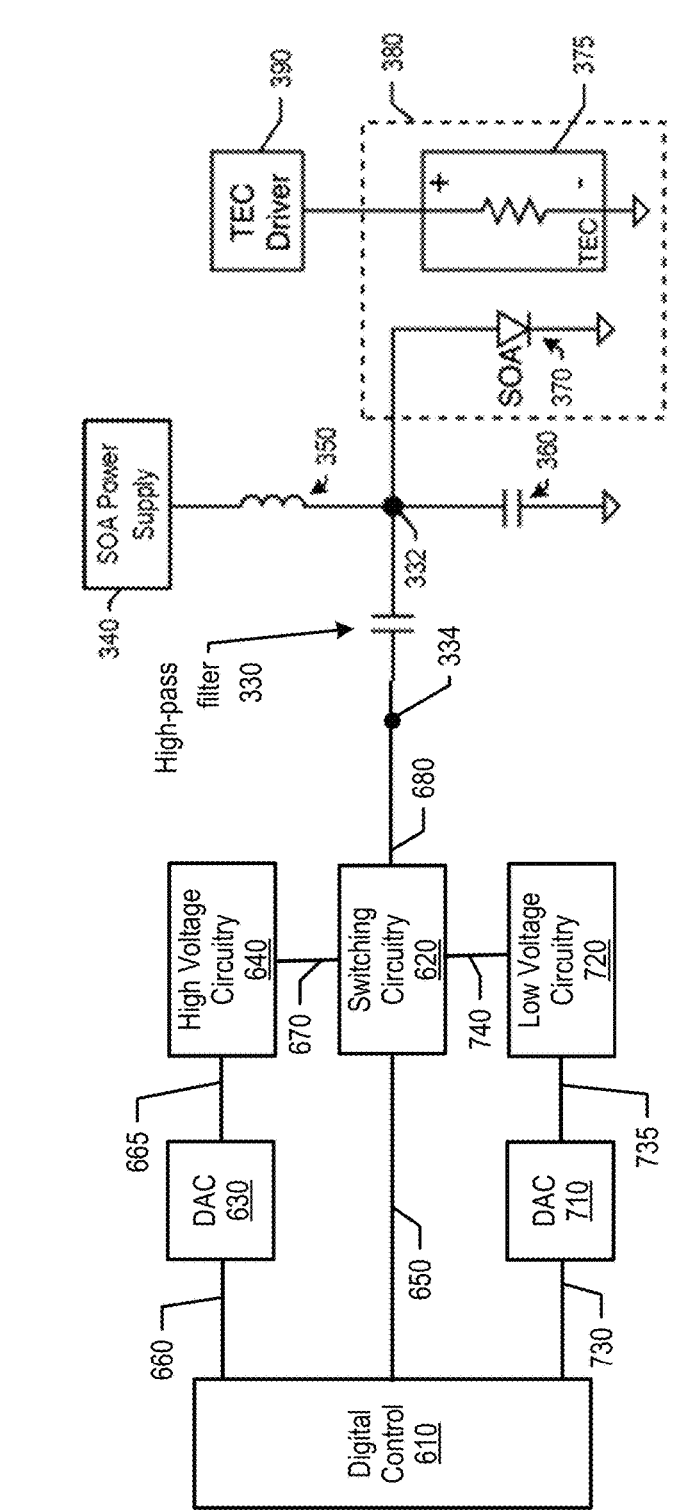
FIG. 7 is a diagram depicting an example using two digital-to-analog converters to control the voltage level of two of the voltage inputs to the switching circuitry, according to some embodiments.

FIG. 7 is a diagram depicting an example using two digital-to-analog converters to control the voltage level of two of the voltage inputs to the switching circuitry, according to some embodiments. Similar to diagram 600, diagram 700 includes digital control 610, DAC 630, high voltage circuitry 640, and switching circuitry 620. In addition, diagram 700 includes DAC 710 and low voltage circuitry 720. Digital control 610 provides digital signal 730 to DAC 710 that, in turn, converts digital signal 730 to analog signal 735 to control the low voltage output 740 of low voltage circuitry 720. This configuration allows switching circuitry 620 to provide optimized high voltage levels and low voltage levels on a per-system basis.

FIG. 8 is a flow diagram illustrating an example method of operating a frequency modulated continuous wave (FMCW) light detection and ranging (LIDAR) system, according to some embodiments of the present disclosure. The method 800 may be performed by any suitable LIDAR system and various components, including the LIDAR system 100, circuitry shown in diagrams 300, 600, or 700, included in optical drivers 103 described above, or a combination thereof. Additional, fewer, or different operations may be performed in the method depending on the particular arrangement. In some embodiments, some or all operations of method 800 may be performed by one or more processors executing on one or more computing devices, systems, or servers (e.g., remote/networked servers or local servers).

In some embodiments, method 800 may be performed by switching circuitry as discussed herein. Each operation may be re-ordered, added, removed, or repeated. In some embodiments, method 800 may be performed by processing logic including hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

In some embodiments, the method 800 may include operation 802 of providing power from a power source to an optical amplifier, wherein the power source couples to a first connection of a high-pass filter. For example, referring to FIG. 3, SOA power supply 340 (power source) provides power to SOA 370 and couples connection 332 to high-pass filter 330.

In some embodiments, the method 800 may include operation 804 of providing a first voltage level to a second connection of the high-pass filter, wherein the first voltage level causes the optical amplifier to turn on. For example, referring to FIG. 3, switch 310 is configured to provide high voltage 315 to connection 334 of high-pass filter 330, which causes SOA 370 to turn on.

In some embodiments, the method 800 may include operation 804 of switching the first voltage level to a second voltage level at the second connection of the high-pass filter, wherein the second voltage level causes the optical amplifier to turn off. For example, referring to FIG. 3, control signal 305 toggles switch 310 to provide low voltage 320 to connection 334 of high-pass filter 330. This causes the voltage level at connection 332 to drop, which turns off SOA 370 as discussed herein.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any embodiment of the present disclosure or of what may be claimed, but rather as descriptions of features specific to particular embodiments of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous wave (FMCW) light detection and ranging (LIDAR) system, comprising:
   a high-pass filter comprising a first connection and a second connection;
   an optical amplifier that couples to the first connection of the high-pass filter;
   a power source that couples to the first connection of the high-pass filter and provides power to the optical amplifier; and
   switching circuitry comprising an output that couples to the second connection of the high-pass filter, wherein the switching circuitry produces at the output a first voltage level and a second voltage level, wherein the first voltage level causes the optical amplifier to turn on, and the second voltage level causes the optical amplifier to turn off.

2. The FMCW LIDAR system of claim 1, wherein a duty cycle period of the switching circuitry comprises switching the output from the first voltage level to the second voltage level, and then switching the output from the second voltage level to the first voltage level.

3. The FMCW LIDAR system of claim 2, further comprising:
   an optical source that produces an optical beam comprising a linear chirp corresponding to a change in frequency modulation, wherein the optical beam is input to the optical amplifier; and
   wherein the duty cycle period commences at a transition point of the linear chirp.

4. The FMCW LIDAR system of claim 2, wherein the duty cycle period occurs within a region-of-interest of the FMCW LIDAR system.

5. The FMCW LIDAR system of claim 2, wherein the duty cycle period is less than or equal to two microseconds.

6. The FMCW LIDAR system of claim 2, further comprising:
   an anode of the optical amplifier, wherein the anode couples to the first connection of the high-pass filter; and
   an inductor that couples to the power source and the first connection, wherein the inductor causes a voltage level at the anode to increase at a time constant when the switching circuitry produces the second voltage level at the output.

7. The FMCW LIDAR system of claim 1, wherein the first voltage level and the second voltage level are non-overlapping at the output of the switching circuitry.

8. The FMCW LIDAR system of claim 1 wherein an integrated circuit comprises the optical amplifier and a thermal-electric cooler (TEC) that cools the optical amplifier.

9. A method of operating a frequency modulated continuous wave (FMCW) light detection and ranging (LIDAR) system, comprising:

providing power from a power source to an optical amplifier, wherein the power source couples to a first connection of a high-pass filter;

providing, by switching circuitry, a first voltage level to a second connection of the high-pass filter, wherein the first voltage level causes the optical amplifier to turn on; and switching, by the switching circuitry, the first voltage level to a second voltage level at the second connection of the high-pass filter, wherein the second voltage level causes the optical amplifier to turn off.

10. The method of claim 9, wherein a duty cycle period of the switching circuitry comprises switching the first voltage level to the second voltage level at the second connection of the high-pass filter, and then switching the second voltage level to the first voltage level at the second connection of the high-pass filter.

11. The method of claim 10, further comprising:

receiving, at the optical amplifier, an optical beam comprising a linear chirp corresponding to a change in frequency modulation; and initiating the duty cycle period at a transition point of the linear chirp.

12. The method of claim 10, wherein the duty cycle period occurs within a region-of-interest of the FMCW LIDAR system.

13. The method of claim 10, wherein the duty cycle period is less than or equal to two microseconds.

14. The method of claim 10, wherein:

an anode of the optical amplifier couples to the first connection of the high-pass filter; and an inductor couples to the power source and the first connection, wherein the inductor causes a voltage level at the anode to increase at a time constant when the switching circuitry produces the second voltage level.

15. The method of claim 9, wherein the first voltage level and the second voltage level are non-overlapping at an output of the switching circuitry.

16. The method of claim 9, wherein an integrated circuit comprises the optical amplifier and a thermal-electric cooler (TEC) that cools the optical amplifier.

17. A frequency-modulated continuous wave (FMCW) light detection and ranging (LIDAR) system, the FMCW LIDAR system comprising:

a high-pass filter comprising a first connection and a second connection;

an optical amplifier that couples to the first connection of the high-pass filter;

a power source that couples to the first connection of the high-pass filter and provides power to the optical amplifier;

a memory to store a set of instructions; and a processor coupled to the memory that, when executing the set of instructions, is configured to:

produce a first voltage level at the second connection of the high-pass filter to cause the optical amplifier to turn on; and switching the first voltage level to a second voltage level at the second connection of the high-pass filter to cause the optical amplifier to turn off.

18. The system of claim 17, wherein a duty cycle period comprises switching the first voltage level to the second voltage level at the second connection of the high-pass filter, and then switching the second voltage level to the first voltage level at the second connection of the high-pass filter.

19. The system of claim 17, wherein the duty cycle period occurs within a region-of-interest of the FMCW LIDAR system.

20. The system of claim 17, wherein the duty cycle period is less than or equal to two microseconds.

\* \* \* \* \*